April 2, 1957 L. BREGUET 2,787,042
AIRCRAFT STRUCTURAL ELEMENTS MADE OUT OF REINFORCED CONCRETE
Filed April 15, 1952 4 Sheets-Sheet 1
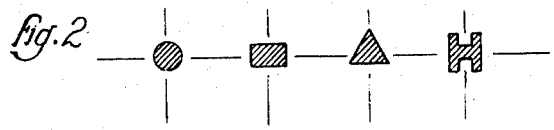
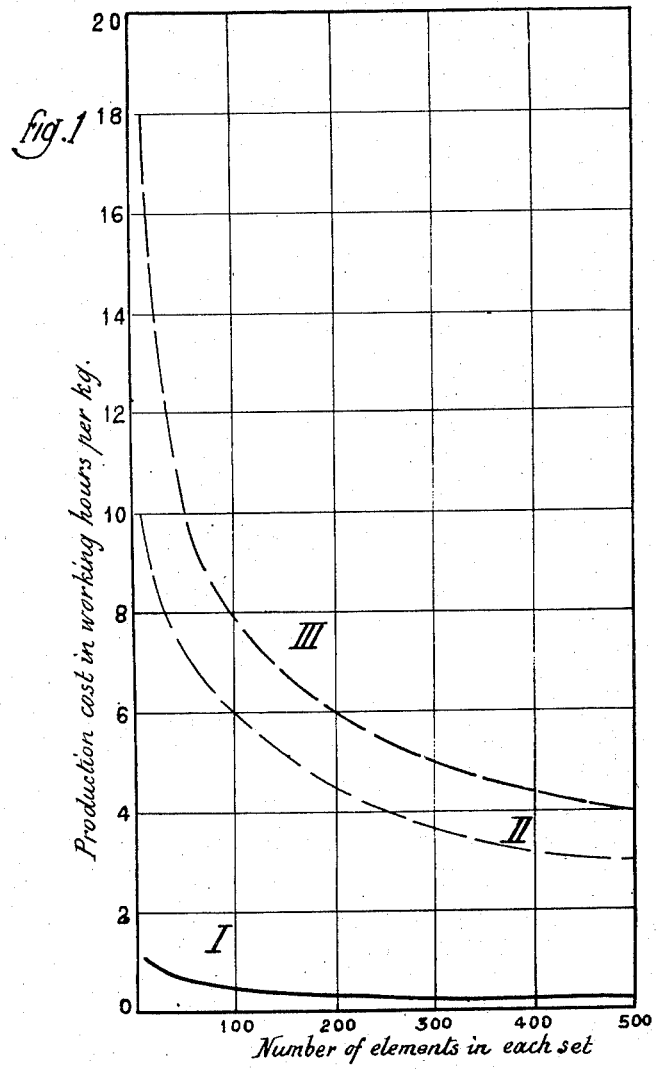
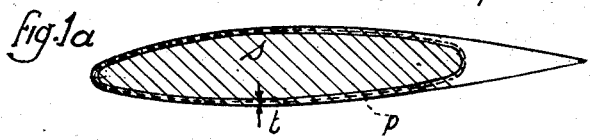

April 2, 1957 L. BREGUET 2,787,042
AIRCRAFT STRUCTURAL ELEMENTS MADE OUT OF REINFORCED CONCRETE
Filed April 15, 1952 4 Sheets-Sheet 2
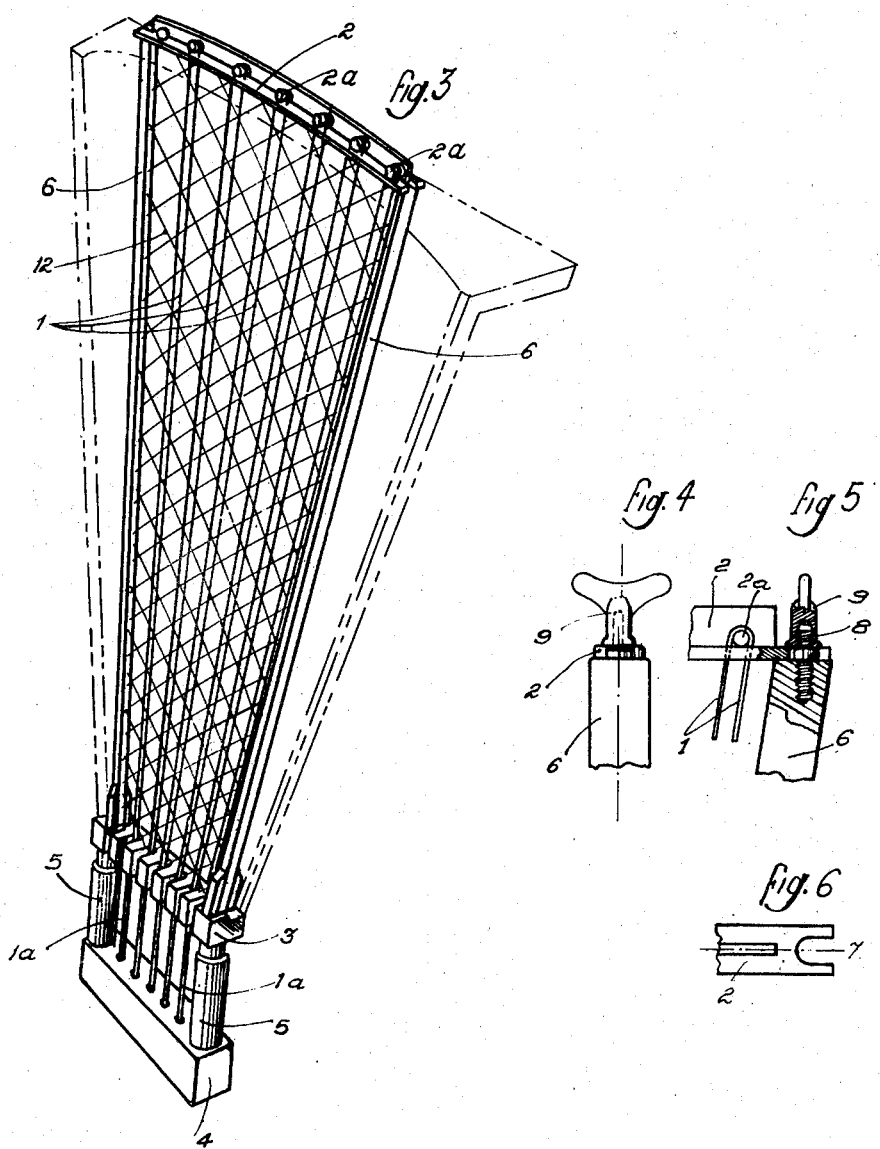

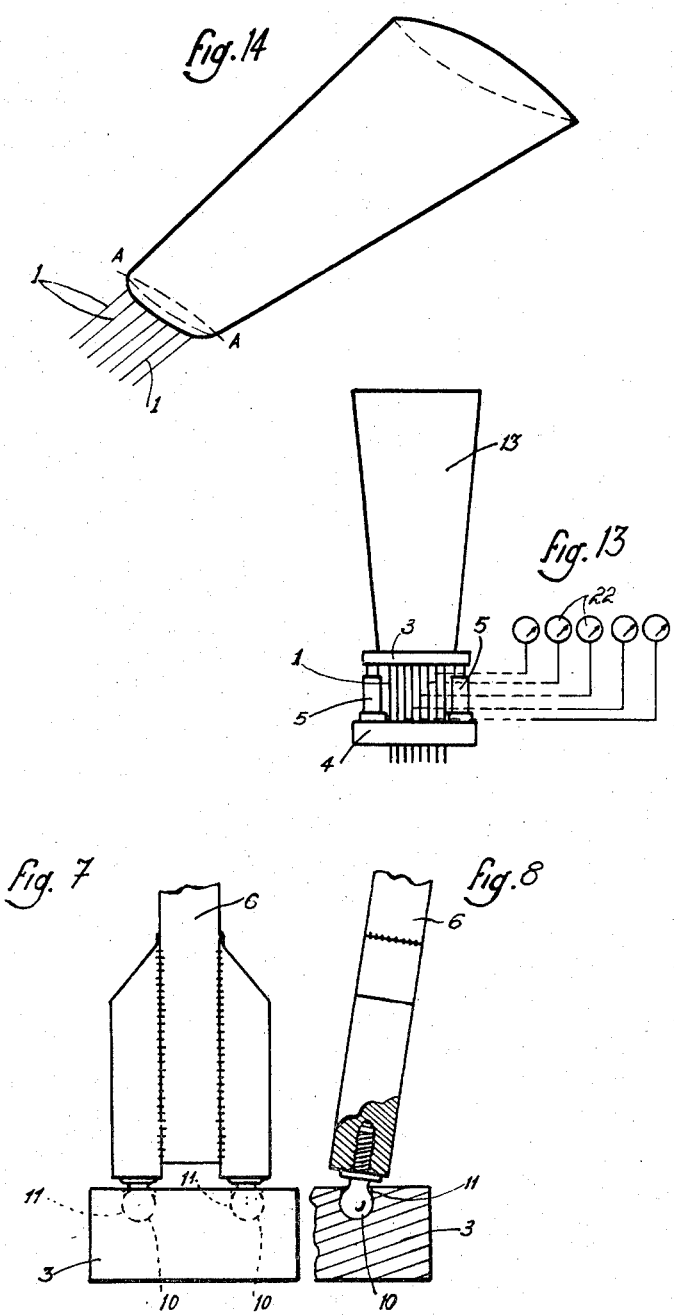

April 2, 1957 L. BREGUET 2,787,042
AIRCRAFT STRUCTURAL ELEMENTS MADE OUT OF REINFORCED CONCRETE
Filed April 15, 1952 4 Sheets-Sheet 4
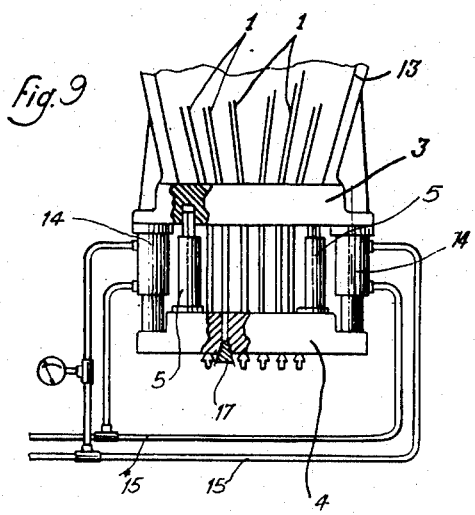
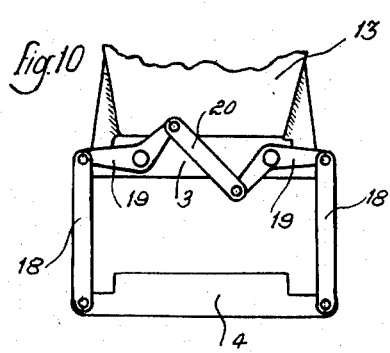
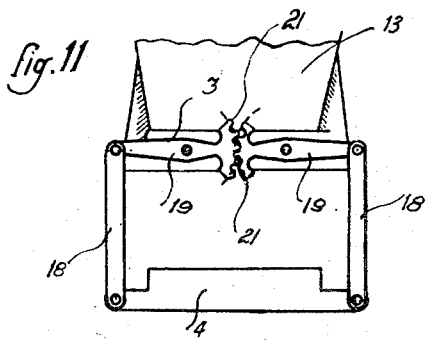
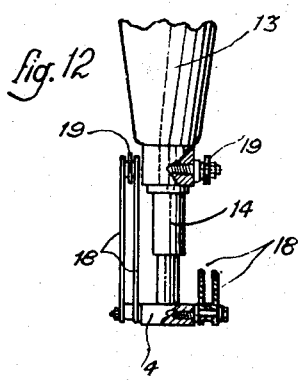
Louis Breguet
By Fraser, Myers & Manley
Attys.

United States Patent Office 2,787,042
Patented Apr. 2, 1957

2,787,042

AIRCRAFT STRUCTURAL ELEMENTS MADE OUT OF REINFORCED CONCRETE

Louis Bréguet, Paris, France

Application April 15, 1952, Serial No. 282,381

Claims priority, application France July 6, 1951

4 Claims. (Cl. 25—118)

This invention relates to the construction of aircraft structural elements out of pre-stressed reinforced concrete, and more especially to improvements in the method of constructing aircraft structural elements out of pre-stressed reinforced concrete as described in French Patent No. 958,272 dated September 12, 1949.

The various objects of my present invention lie in the provision of various improvements in the prior method just mentioned, whereby the construction of pre-stressed reinforced concrete aircraft structural elements, and especially wings, may be very substantially accelerated and reduced in cost.

The construction of aircraft elements, especially wing units, out of pre-stressed reinforced concrete, has many advantages.

Among the most important, as shown in detail hereafter, is the great reduction in price achieved thereby over conventional methods such as those using light alloys or steel electrically welded, the saving being especially marked in the case of large quantity production.

Another advantage of this type of aircraft structural elements relates to surface condition. A very high polish can readily be obtained for example by buffing the surface of the molded element. The great importance assumed by a highly polished surface condition of the wings and other aircraft elements in connection with supersonic craft is well-known. In cases where such a high surface polish is unnecessary, as in the case of lower speed aircraft, the buffing step can be omitted and paints or other surface coating compositions may be applied as by gun-spraying, which is particularly satisfactory for low-cost production of expendible craft, such as guided missiles flying at subsonic velocities. In this connection, it should be noted that concrete provides an excellent bonding surface for such coatings; moreover any desired colors may easily be obtained.

The use of pre-stressed concrete makes it possible to achieve a very high degree of accuracy in the contour design, since the contour of a mold can easily be followed to within a maximum error of the order of about 0.2 or 0.3 mm. Similarly, the spin or incidence angle of an airfoil element, such as a wing, can be obtained to within an error not greater than a few angular minutes, which is especially desirable in the case of supersonic aircraft.

An element made of pre-stressed concrete possesses, owing to its greatly increased wall thickness, a torsional rigidity which is much higher than that of a similar metal element; this may produce a substantial reduction in elastic interference, a highly important consideration for acrobatic flight under heavy loads.

In connection with the temperature elevation to which aircraft surfaces are subjected, especially at supersonic speeds, owing to the friction against the surrounding air molecules, it should be noted that the improved characteristics of concrete in respect of temperature elevation will make it possible through the use of pre-stressed concrete, to eliminate or attenuate the limitation imposed heretofore on the maximum velocities attainable by metallic craft.

The above enumerated advantages of pre-stressed reinforced concrete in the construction of aircraft elements such as wings were, of course, present in the invention described in my aforementioned French patent. These advantages are, however, greatly enhanced by the teachings of the present invention.

It is therefore an object of this invention to provide improvements in the construction of pre-stressed reinforced concrete aircraft structural elements, and more especially to increase the rate and reduce the cost of production thereof.

Another object is to reduce the length of tie-up time and correspondingly increase the rate of rotation of the individual concrete molds used in molding such elements.

A specific object of the invention is to provide a reinforcement structure in the form of a self-supporting preformed frame or panel adapted to be constructed separately from the molding operation and to be inserted into a mold when required to mold an element, whereby the mold will not have to remain tied up during the whole time necessary to mount the reinforcement wires.

Another object is to provide such a reinforcement structure or panel in which means are provided for simultaneously tensioning all the reinforcement wires stretched thereacross.

A further object is to provide such a reinforcement panel which can be readily dismantled, and more specifically to provide such a panel which comprises removable side frame members adapted to be readily removed after the reinforcement wires have been inserted into the mold and tensioned.

Yet another object is to provide a reinforcement panel or frame of the type described which comprises an upper and a lower cross member and a base member, removable side members, and tensionable reinforcement wires attached to the upper cross member and the base member and extending through the lower cross member, and means, in the form of fluid-operated pressure members, operating between the lower frame member and the base member for tensioning said armature wires.

A further object is to provide means for readily indicating the tension of the reinforcement wires at any stage during the construction process. In this connection, a specific object is the provision, in a reinforcement frame of the kind specified in the foregoing paragraph, of strain-gauge means or the like associated with the lengths of reinforcement wires intermediate said lower cross member and said base member.

Yet another object of the invention relates to an improvement in the manner of forming that end of a molded element of the type described, wherefrom the reinforcement wires protrude. In this connection, the invention comprises molding the element to a length dimension slightly in excess of the desired final length, and then cutting off the excess length of concrete together with the protruding reinforcement wires, so as to obtain an element of accurately predetermined length having a square-cut tip surface.

The above and further objects, features and advantages of the invention will appear from the ensuing disclosure.

The invention will now be described, by way of illustration but not of limitation, with reference to some exemplary embodiments thereof illustrated in the accompanying drawings wherein:

Fig. 1 is a graph illustrating a comparison between a pre-stressed concrete wing of the type to which this invention relates, and two wings of similar characteristics, but of conventional (metallic) construction.

Fig. 1a is a diagrammatic sketch serving to illustrate the rigidity characteristics of a concrete element.

Fig. 2 shows some examples of sectional configurations for reinforcement wires usable according to the invention.

Fig. 3 is a diagrammatic perspective showing of the improved reinforcement mounting frame or panel.

Figs. 4 to 8 are detail views on an enlarged scale relating to parts of Fig. 3.

Fig. 9 is a diagrammatic view, in elevation, of means usable according to the invention for placing the reinforcement wires under tension.

Figs. 10 and 11 are elevational views of compensating means that may be associated with the tensioning device of Fig. 9.

Fig. 12 is a diagrammatic side view showing the manner in which the means of Fig. 10 or 11 can be associated with the tensioning device of Fig. 9.

Fig. 13 is a diagram illustrating the measurement of the reinforcement tension.

Fig. 14 illustrates the formation of a wing-tip section on a concrete wing member according to the invention.

To the end of providing a clear idea of the saving in production cost made possible by constructing an aircraft airfoil element or wing out of pre-stressed reinforced concrete according to the invention the following table is given.

*Cost (expressed in working hours) of producing a 150 kilogram wing unit*

| Quantities | 10 | 50 | 200 | 500 |
|---|---|---|---|---|
| Description of Operations | Work hours per unit | | | |
| 1. Construction of Reinforcement Supports | 30 | 18 | 8 | 4 |
| 2. Construction of sheet-metal stiffener webs | 6 | 3 | 1.5 | 1 |
| 3. Positioning the Reinforcement wires | 50 | ¹ 20 | ¹ 13 | ¹ 12 |
| 4. Mixing and pouring the Concrete | 8 | 6 | 4.5 | 3 |
| 5. Mould-stripping | 4 | 3 | 2 | 1.5 |
| 6. Polishing and finishing | 18 | 14 | 10 | 8 |
| 7. Assembly | 8 | 4 | 2 | 1.5 |
| 8. Painting | 8 | 6 | 4 | 3 |
| 9. Total of Production Hours | 132 | 74 | 45 | 34 |
| 10. Total cost of Tooling Equipment | 10,000 | 13,000 | 16,000 | 20,000 |
| 11. Number of Units required for redeeming cost of tooling Equipment | 300 | 600 | 1,200 | 2,000 |
| 12. Cost of tooling per unit | 33 | 22 | 13 | 10 |
| 13. Total cost per unit | 165 | 96 | 58 | 44 |
| 14. Cost (in hrs.) per kilogram weight of Reinforced Concrete Structure | 1.1 | 0.64 | 0.39 | 0.29 |
| 15. Cost (in hrs.) per kilogram weight of Light Alloy Structure | 18 | 10 | 6 | 4 |
| 16. Cost (in hrs.) per kilogram weight of welded steel Structure | 10 | 7.2 | 4.5 | 3 |

¹ Including pre-assembly frame.

In the above table, lines 1 to 9 inclusive indicate the component items entering into the computation of the production cost of a wing unit having a total weight of 150 kg., referred to various quantities of units produced. All items and costs are expressed in working hours.

Line 10 similarly indicates, in working hours, approximate values for the cost of tooling equipment required. Line 11 states the quantity of units required to be produced in order to redeem the cost of this equipment. Deriving therefrom, line 12 states the cost of tooling equipment referred to a unit produced, so that the sum total of the figures in lines 9 and 12 yields the total cost per unit.

Lines 14, 15 and 16 provide a comparison between the production costs per unit weight expressed as working hours per kilogram of structure produced, in the case of conventional constructions and the improved construction of this invention. The data from lines 14, 15 and 16 has been employed to draw up the chart of Fig. 1, wherein the production costs per unit weight have been plotted against quantities. Curve I refers to a pre-stressed concrete unit according to the invention; curve II relates to a spot-welded steel unit; and curve III relates to a conventional riveted light-alloy unit.

A glance at this chart will clearly show the very great saving afforded by the pre-stressed concrete construction of the type contemplated by the invention.

This graph has been plotted with the number of elements in each set as abscissae and the production cost in working hours per kg. as ordinates.

It should further be noted that the rate of production, an especially important consideration in defense industries is particular high in concrete construction. Normally, with the use of melted cement, each mold can produce one aircraft structural unit (such as a wing or the like) per diem, and this period can be reduced to as little as a few hours in high quantity production by the use of methods for quick-setting the cement with superheated steam.

Moreover, the reinforced concrete elements possess a much higher resistance to twisting stresses than do the conventional metallic structural elements. Referring to Fig. 1a, which shows a cross-section of a hollow reinforced concrete air foil element in which the length of the mean stressed fibre is designated by $p$, the total sectional area by $s$ and the skin thickness by $t$, the torsional rigidity $\phi$ of the element may be expressed according to Bredt-Leduc's formula as $$\phi = G.J = G.4\frac{t}{p}s^2$$

For a given cross-section $s$, the value of $\phi$ therefore depends on G and $t$, wherein G is the torsional coefficient of elasticity of the reinforced concrete. In the case of the over-compressed vibrated pre-stressed reinforced concrete preferably used in constructing aircraft structural elements according to the invention, G has a value of 2,500 kg./sq. mm., which is nearly equal to the value of G for light alloys.

Since the wall thickness of a hollow concrete box-beam is substantially greater than the wall thickness of a corresponding stiffened thin-gauge sheet metal structure of similar form it will be seen that the torsional rigidity of the concrete structure will be much higher than that of a sheet metal structure of comparable characteristics; this at the same time has the further consequence of reducing elastic interference in the concrete element.

Moreover, in acrobatic flight under heavy aerodynamic loads, the lack of stability of thin skin covering is liable to introduce an objectionable reduction in rigidity (cf. the article "Nonlinear effects of structural deformation on stability," by A. Epstein, in "Journal of the Aeronautical Sciences," 1951). This detrimental effect is eliminated by the use of a concrete structural element owing to the increased wall thickness therein.

The major item of labor expenditure in the construction of a prestressed concrete element relates to the mounting of the reinforcements. Where the reinforcements are directly positioned in the mold, as is the conventional procedure, the mold remains tied up for the whole time required to mount the reinforcements therein, thereby considerably increasing the over-all duration of the manufacturing process.

This difficulty is overcome by the present invention.

As shown in Fig. 2, the reinforcement elements or wires may be provided with a circular cross-section (conventional piano-wire), or they may be rectangular, triangular, H-shaped or elements having yet other configurations may be used, wherein the ratio from the peripheral length to the cross-sectional area is larger than is the case of a circular section, thereby increasing the bonding surface between the reinforcement wire and the concrete.

As shown in Fig. 3, according to the invention the longitudinal reinforcing wires or cables are stretched across a frame, being connected at their one ends to an upper cross member 2 which may have the form of a T member of which the web has pins or lugs 2a projecting from the sides thereof, for attachment of the reinforcing wires, end loops of the respective reinforcing wires being slipped over said pins 2a, and perforations being formed in the flange of the T-member for passing said wires therethrough (see Figs. 3 and 5).

The free ends 1a of the wires are passed through a lower cross member 3 and are secured in a base member 4 spaced from and connected with member 3 through expansible spacer guide members 5.

The cross members 2 and 3 of the frame are interconnected by readily removable side members 6, thus providing an entirely separate and self-supporting auxiliary mounting frame for the reinforcements, instead of the cross members 2 and 3 being directly positioned in the mold and then stretching the reinforcement wires thereacross, as was described in the aforementioned French patent. In this way, the present invention avoids tying up the mold throughout the comparatively lengthy reinforcement mounting operations.

By using the teachings of this invention, accordingly complete reinforcement assemblies in the form of self-supporting panels can be prepared in advance and independently of the casting operations, the complete panels being inserted in the molds progressively as they are required. For this purpose, it is only necessary to secure the cross members 2 and 3 to the mold, remove the side members 6, and cover up the mold, whereupon concrete may be poured thereinto to form the structural element. It will be understood that owing to this procedure the over-all time during which a mold is tied up will be hardly any greater than the time taken by the concrete to set to a satisfactory degree of hardness.

It lies within the scope of the invention to provide a separate frame of the kind just described, for each of a pair of sets of reinforcements on opposite sides of the mold, as where an aircraft wing is to be produced having a first set of reinforcements adjacent the upper wing surface and another set adjacent the under wing surface. In such cases the lower cross member 3 and base member 4 of each frame would each constitute one half of the complete corresponding parts of the mold.

A frame of this specific type is shown in detail in Figures 3 to 8. Referring to Figs. 4 to 6, the upper cross member 2 is formed at each end thereof with a slot 7 adapted to be engaged by a threaded pin 8 projecting from the upper end of side member 6 and provided with a clamping nut 9.

Figs. 7 and 8 illustrate the attachment of the lower cross member 3 to the adjacent ends of the side members. Each side member such as 6 is provided with two ball elements 10 adapted to engage in corresponding recesses 11 formed in cross member 3. With this arrangement, the frame is very easily assembled and dismantled, it being only necessary to place or remove the nut 9 in order to assemble or disassemble the components of the frame.

As shown in Fig. 3, secondary reinforcement means may if necessary be associated with the main reinforcing wires, such secondary means being shown in the form of a wire net 12 or the like made of expanded metal.

In the aforementioned French patent, individual tensioning means were described for tensioning the reinforcement elements or wires. According to a feature of the present invention, means may be provided for placing all the reinforcement wires under tension simultaneously. To this end, the base member 4 may be shifted in a parallel path away from the upper cross member. Provided all the individual elements 1 have substantially the same length and same initial tension, such as a parallel displacement will result in imparting to all the wires a substantially uniform tension approaching the desired degree of tension with a sufficiently close approximation. Figs. 9 to 12 illustrate one example of a tensioning arrangement of this type.

As there shown, hydraulic jack units 14 are mounted between the lower cross member 3 and base member 4 secured under a mold 13, lower cross member 3 serving as an end wall member for the mold. The jack units 14 are connected by supply lines 15, provided with pressure gauges 16, with a suitable source of pressure fluid, not shown. The reinforcing wires 1 extending through lower cross member 3 are anchored in the base member 4, for example by means of the frustoconical blocking members 17 shown.

In order to synchronize the movements of jacks 14 for the purpose of producing a strictly parallel displacement of the base member 14, balancing means are associated with members 3 and 4, comprising opposing links 18 pivoted on one side to the base member 4 and on the other to the outer ends of levers 19 which are pivoted at intermediate points thereof to the lower cross member 3 (Figs. 10 to 12). The inner ends of levers 19 may, as shown in Fig. 10, be interconnected by a link 20, or in the modification shown in Fig. 11, said inner ends may be formed with gear sectors 21 adapted for meshing engagement with each other. Preferably, a balancing linkage 18, 19, 20 or 21 such as described, is provided one on each side of the base members 3—4.

In the construction described, the free length of the reinforcing wires extending intermediate the lower cross members 3 and 4 can advantageously be utilized in order to measure the tension present in said wires at any stage during production. To this end, as diagrammatically shown in Fig. 13, there may be fitted to any desired ones of the reinforcing wires 1 a device 22 of any suitable type, conventional in the art, for indicating the tension obtaining in the related wire on mounting the wires, during tensioning and after removal of the tensioning pressure. Electrical strain gauges are desirably used for this purpose.

After the cast concrete element has been removed from the mold, the free ends of the wires 1 project out of the concrete (Fig. 14). With the object of eliminating the necessity of cutting the protruding ends, then grinding the cut ends flush with the concrete surface, a procedure which is objectionable in that it is apt to produce burrs and other irregularities in the finished element, according to the invention the element is initially cast so as to have a length slightly in excess of its desired final value. After removal from the mold, the element is then cut squarely to length along the desired line AA, using such means as a rotary Carborundum cutting disc or the like. Such cutting procedure will in all cases provide a square clean cut, which will be found particularly desirable in cases where some additional attachments or fixtures are to be affixed to the ends of the elements, e. g. wing-tip fuel tanks, smoke-generating units, profiled radar antennae, navigation lights or the like. Where the element is to be provided with a rounded tip or extremity, an additional forming step may be included subsequent to the cutting operation.

It will of course be understood that many modifications may be made in the exemplary structural details and steps of procedure illustrated and described within the scope of the ensuing claims.

What I claim is:

1. An apparatus for positioning reinforcement elements in a mold having opposite ends for making an aircraft structural element of pre-stressed reinforced concrete and the like, said apparatus comprising a self-supporting frame separate from the mold, said frame having a first cross-member, a second cross-member, removable side members adapted for maintaining said first and second cross-members in spaced relation, a third cross-member, means for maintaining said third cross-member in parallelism with said second cross-member, means on said first cross-member and on said third cross-member for supporting tensionable reinforcement elements, said frame being adapted for cooperation with said mold for positioning such reinforcement element when supported on said frame within the interior of the mold with said first and second cross-members being in abutting relation with the external surfaces of said opposite ends of said mold and with said side members being removed before pouring the concrete, means disposed between said third cross-member and said second cross-member for tensioning said reinforcement element and operative to displace said third cross-member with respect to said second cross-member, and said frame being further removable from its cooperative relation with the mold to leave the reinforcement element within the concrete after it has set in the mold.

2. An apparatus according to claim 1 wherein balancing linkage means interconnect said second cross-member and said third cross-member.

3. An apparatus according to claim 1 wherein said second cross-member has openings therein through which the tensionable reinforcement elements may extend.

4. A molding assembly for an aircraft structural element of pre-stressed concrete and the like reinforced with wires, comprising in combination, a mold having a molding cavity having opposite ends, a separate self-supporting frame having a first cross-member, a second cross-member, removable side members for maintaining said first and second cross-members in spaced relation, and a third cross-member adapted to be maintained in parallelism with said second cross-member, said first and second cross-members being adapted to be brought into abutting relation with the external surfaces of said ends of said mold respectively, said first and third members being adapted to support said wires through said molding cavity; and means between said second and third cross-members for moving them apart to tension the wires.

References Cited in the file of this patent
UNITED STATES PATENTS

| 780,321 | Burkholder et al. | Jan. 17, 1905 |
| 2,303,062 | Parkhurst | Nov. 24, 1942 |
| 2,590,478 | Weinberg | Mar. 25, 1952 |

FOREIGN PATENTS

| 819,670 | Germany | Nov. 5, 1951 |
| 958,272 | France | Sept. 12, 1949 |